Nov. 21, 1961     T. PATRIGNANI     3,009,723
MOTION TRANSMITTING MECHANISM
Filed May 23, 1960     4 Sheets-Sheet 1
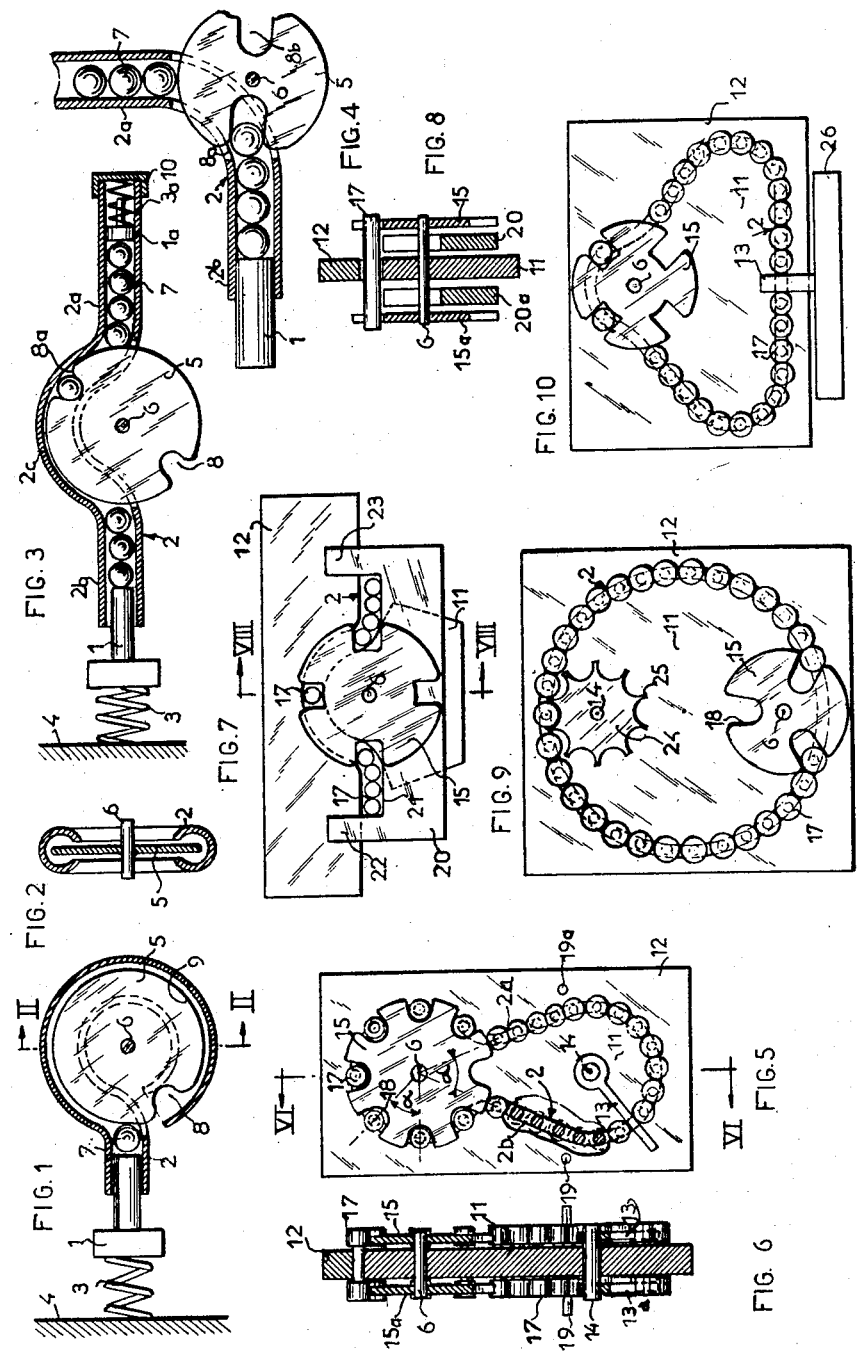

Nov. 21, 1961     T. PATRIGNANI     3,009,723
MOTION TRANSMITTING MECHANISM
Filed May 23, 1960     4 Sheets-Sheet 2
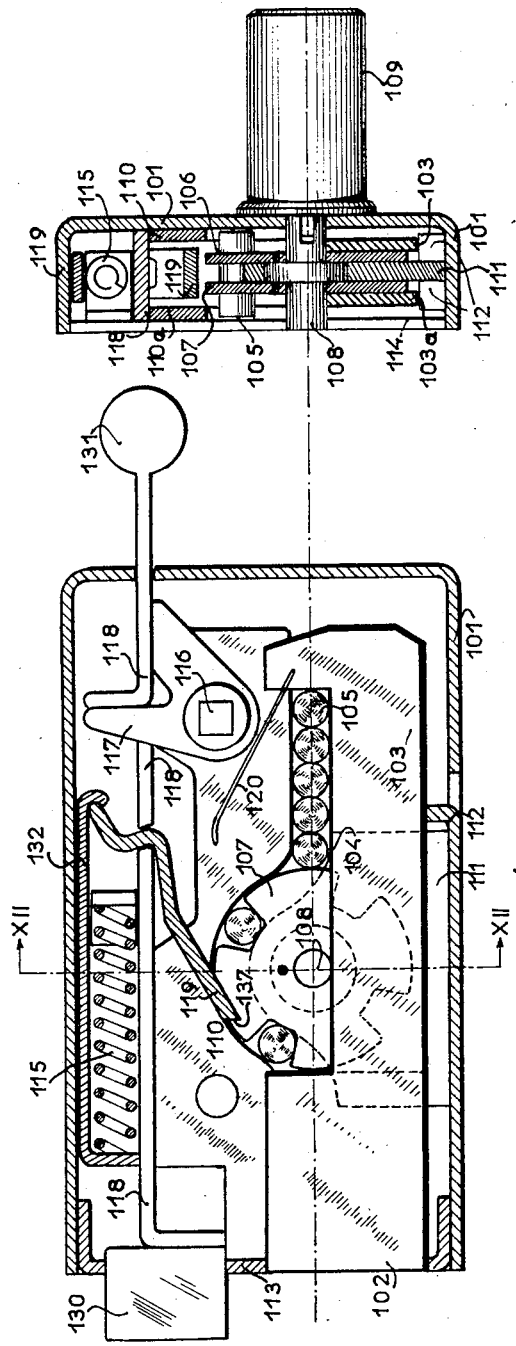

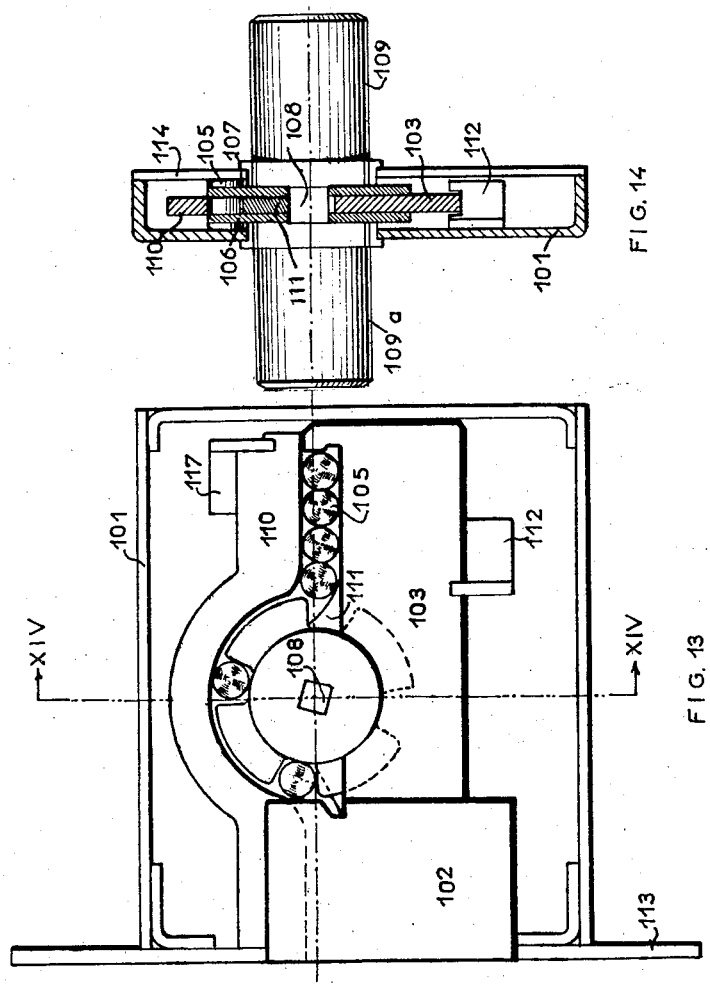

United States Patent Office 3,009,723
Patented Nov. 21, 1961

3,009,723
MOTION TRANSMITTING MECHANISM
Théo Patrignani, 6 Rue des Eaux, Paris, France
Filed May 23, 1960, Ser. No. 31,145
Claims priority, application France May 28, 1959
5 Claims. (Cl. 292—33)

This invention relates to mechanism for transmitting motion from a drive to a driven member, and more especially for transmitting motion in incremental steps.

An object of the invention is to provide mechanism for incrementally transmitting motion from a drive to a driven member wherein the driven member will be inherently blocked against displacement outside its periods of displacement, and wherein such blocking action does not require the provision of springs or other deformable means. An object is to provide novel motion transmitting mechanism which will be highly reliable and positive-acting, will be capable of transmitting large forces and will embody only a relatively small number of simple parts of more or less standard construction. An object is to provide a new way of transmitting incremental rotational motion to a rotatable or a linearly displaceable part. An object is to provide such incremental motion transmitting mechanism which will be versatile and applicable to a variety of mechanical apparatus, and inter alia door locks and the like. An object is to provide such mechanism in which the total displacement of a driven member may be subdivided into as many incremental steps as desired and may involve any desired number of revolutions of the drive member, within reasonable limits. Other objects will appear.

The invention in one aspect comprises mechanism for incrementally transmitting motion from a rotatably mounted drive member to a displaceable driven member, which comprises at least one rigid force-transmitting element for example a ball or roller, and means defining a path of motion therefor; said drive member having a circumferential surface positioned on said path and said driven member having a surface positioned on said path, spaced from and movable toward and away from said circumferential surface; and at least one recess in said circumferential drive member surface interposable into said path on rotation of the drive member, for selectively removing and inserting said element, or each of said elements one by one, from between and in between said surfaces and thereby varying the position of the driven member.

In a preferred aspect, said mechanism comprises a plurality of elements, for example balls or rollers, and means defining a path of motion therefor; said drive member having a circumferential surface positioned on said path and said driven member having a surface positioned on said path, spaced from and movable toward and away from said circumferential surface whereby the number of said elements included on said path between said surfaces will incrementally determine the position of the driven member; and at least one recess in said surface of the drive member interposable into said path on rotation of the drive member for selectively removing and inserting elements of said plurality from between and in between the surfaces and thereby incrementally varying the position of the driven member.

In a further preferred aspect, the circumferential surface of the drive member divides said path of motion into two sections on opposite sides of the drive member, the drive member surface having at least one pair of recesses therein thereby being adapted, on rotation of said drive member, simultaneously to remove one element from one path section and inserting another element into the other path section for positively shifting the driven member in incremental steps each corresponding to the dimension of one of said elements as measured along said path.

Embodiments of the invention will now be described for purposes of illustration but not of limitation with reference to the accompanying drawings, wherein:

FIG. 1 is a view in longitudinal section illustrating a simple form of mechanism and explaining the principle of the invention;

FIG. 2 is a cross section on line II—II, FIG. 1;

FIG. 3 is a view similar to FIG. 1 showing another embodiment;

FIG. 4 is a similar view showing yet another embodiment;

FIG. 5 is an elevational view of a two-way motion-transmitting mechanism according to the invention in which the driven member is angularly displaceable;

FIG. 6 is a cross section on line VI—VI of FIG. 5;

FIG. 7 is a view showing a two-way motion-transmitting mechanism in which the driven member is linearly displaceable;

FIG. 8 is a cross section on line VIII—VIII of FIG. 7;

FIG. 9 shows an embodiment in which the driven member is continuously rotatable;

FIG. 10 shows a modifical embodiment in which the motion of the driven member is similar to that in the device of FIGS. 7 and 8;

FIG. 11 is an elevational view of a lock assembly embodying mechanism according to the invention for actuating a dead bolt therein;

FIG. 12 is a section on line XII—XII of FIG. 11;

FIG. 13 is an elevational view of a simplified lock assembly embodying mechanism according to the invention;

FIG. 14 is a cross section on line XIV—XIV of FIG. 13; and

Figure 15:
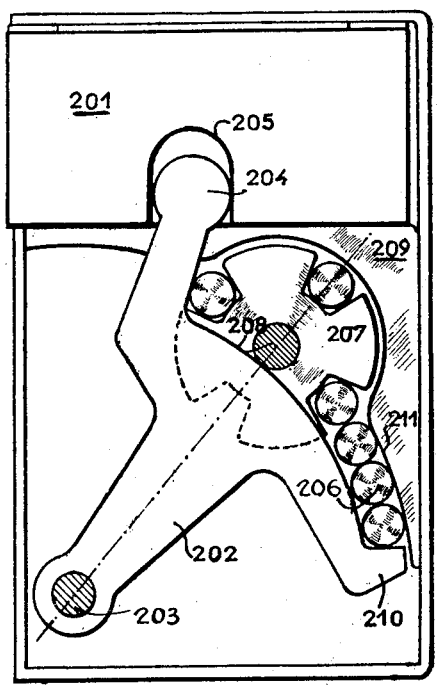
FIG. 15 is an elevational view of another form of lock assembly incorporating mechanism according to the invention.

The device illustrated in FIGS. 1 and 2 comprises a driven member 1 having an integral shank portion slidable in a channel element 2 and actuated by a spring 3 having its other end supported against a stationary frame surface 4 so as to urge the plunger into the channel 2. The channel 2 constitutes a rectilinear extension of a spiral-shaped casing formed with an annular slot in its inner periphery so as to define an inner recess within which a disk-shaped cam drive member 5 is freely rotatable about a pivot 6. Interposed between the inner end of the plunger shank 1 and the periphery of the cam 5 is a force-transmitting element in the form of a ball 7. The cam 5 is formed with a recess 8 at one point of its periphery so dimensioned as to receive the ball 7 therein whereupon the ball may be carried with the cam member into and through the annular groove defined in the periphery of the channel casing 2 on rotation of said cam. Thus, assuming the drive member 5 is rotated clockwise, it will be seen that as the recess 8 reaches a position registering with the straight portion of channel 2, the ball will be pushed into the recess by the action of spring 3 and the plunger 1 is allowed to penetrate into the channel 2 by a distance corresponding to the diameter of the ball. As the cam 5 is rotated further, the ball 7 is carried into the annular groove, while the plunger 1 remains stationary with its inner end engaging the circumferential surface 9 of cam disk 5. If the rotation of cam disk 5 be reversed, the ball 7 on again attaining the orifice of the straight channel portion is cammed outwards owing to the continuous curvature of the spiraloid groove or channel 2. The ball 7 thus urges the plunger 1 outwards, and then remains stationary whilst cam disk 5 continues to be rotated with its circumferential edge 9 engaging the ball.

In the embodiment of the invention illustrated in FIG.

3, the drive member or cam disk 5 is formed with two diametrically opposed notches 8 and 8a, and the conduit 2 is formed with two straight, opposite, substantially aligned outer portions 2a and 2b in a generally symmetrical arrangement to either side from the centre of the cam 5, interconnected by an arcuate channel portion 2c partly surrounding the periphery of the cam. A spring 3a has its outer end seated against a cover 10 sealing the outer end of channel portion 2a and its inner end acting on a plunger 1a slidable in said channel portion so as to urge continuously an array of balls 7 within the channel portion towards the periphery of the cam 5. Thus the channel portion 2a constitutes a store of balls 7. The arcuate mid-portion 2c of the channel is internally slotted to permit the rotation therein of a peripheral portion of the cam disk 5, as in FIGS. 1 and 2. The opposite channel portions 2a and 2b are substantially coaxial, with their common axis extending substantially through the pivotal center 6 of the cam. Associated with the opposite straight conduit portion 2b is a plunger and spring arrangement similar to that described with reference to FIG. 1. Thus the cam recesses 8 and 8a are presented simultaneously, on rotation of the cam disk, into register with the two straight conduit sections 2a and 2b respectively. Depending on the direction of rotation of the cam disk the balls 7 will be transferred one by one from portion 2a to portion 2b of the channel, against the force of spring 3, or from part 2b into part 2a of the channel against the spring 3a, in which latter event the plunger 1 will sink by incremental amounts into the conduit portion 2b. In this device, every time the drive member 5 has completed a revolution, the driven member 1 will be displaced a distance equivalent to twice the diameter of the balls 7 since two balls 7 will have been transferred during said revolution from one to the other side of the channel.

The form of embodiment shown in FIG. 4 is generally similar to that of FIG. 3 except that the channel or conduit structure 2 has its two opposite channel portions disposed at an angle, e.g. a right angle, with respect to each other. The drive member or cam disk 5 is pivoted on a pivot axis 6 disposed substantially at the geometrical intersection of the axes of both conduit portions 2a and 2b. The balls 7 positioned in conduit portion 2a may be urged into engagement with the cam 5 by the action of gravity, whereby spring 3a and plunger 1a are omitted. The vertical channel portion 2a may if desired be extended by an enlarged or flared portion, not shown, providing a storage magazine for the balls 7. Thus the amount of displacement of driven member 1 will only be limited in practice by the number of balls 7 available, and the length of the conduit portion 2b.

In the form of device shown in FIGS. 5 and 6, the force transmitting elements rather than being balls are in the form of dumb-bell-shaped rollers 17. The rollers 17 ride with their cylindrical intermediate shank portions along a channel 2. This channel is actually an arcuate groove defined between the complementarily formed, spaced edge surfaces of a pair of shaped plates, including the outer plate 12 an inner plate 11, suitably assembled by means not shown. The driven member (corresponding in function to plunger 1 of the preceding examples) is here provided as a pair of parallel spaced arms 13 and 13a rotatable on opposite sides of the plate 11 by means of a hub 14 pivoted in the plate. The drive member (corresponding in function to the cam disk 5 in the foregoing examples) is provided as the pair of cam disks 15 and 15a secured on a common drive shaft or pivot 6 journalled in plate 11 and said disks being formed with the angularly equi-spaced recesses 18, herein eight in number. The angular spacing, α between adjacent recesses such as 18 of the disk 15 (or 15a) is equal to the angle α formed between the converging straight end portions 2a and 2b of the channel 2, it being noted that the ideal point of intersection of said straight conduit or channel legs 2a and 2b coincides with the axis of pivot 6.

Hence, it will be realized that two consecutive recesses 18 will simultaneously be presented into register with the ends of conduit legs 2a and 2b respectively, thus allowing a roller 17 to enter a notch from one end of the conduit as another roller is issuing out of the adjacent notch into the other end of the channel. In operation, when the drive or cam disks 15 and 15a are rotated in unison, the fork member 13—13a is forced into incremental rotation by successive angular increments each determined by the diameter of a roller 17. A pair of abutments 19 and 19a are suitably positioned on plate 12 to restrict the displacement of the fork 13—13a to the arcuate portion of the channel.

In the embodiment shown in FIGS. 7 and 8, the drive member again comprises a pair of parallel spaced rotatable disks 15 and 15a secured on a common pivot 6 journalled in a platen 11. The upper part of the platen 11 is formed with a semi-circular extension having its center at the geometrical axis of pivot 6 and connecting at each end over symmetrical curves with the ends of platen 11. This arcuate upward extension of the platen defines an inner wall for an arcuate conduit 2 in which a set of elongated cylindrical rollers 17 ride. Another platen 12 of complementary shape is suitably positioned above the platen 11 to define the upper wall of the arcuate channel 2. The driven member is here provided as the interconnected pair of parallel spaced plates 20 and 20a positioned to either side of platen 11 and freely slidable therealong, each plate operating between the adjacent side of platen 11 and that of a corresponding one of the drive disks or cams 15, 15a. Each plate 20 or 20a includes a straight upper edge portion 21 which defines the under wall of a related straight leg of the channel 2, the upper wall of which is defined by the under edge surface of the platen 12. The straight channel leg portions are limited by upwardly projecting abutting parts 22 and 23 of the plates 20 and 20a. The operation of this device will be easily inferred from that of the preceding embodiments of the invention, and it will be seen that on rotation of the drive member 15—15a, the driven member 20—20a will be forced into displacement in a corresponding direction by successive increments corresponding to the roller diameter.

In both the embodiments last described with reference to FIGS. 5-6 and 7-8, it will be noted that the driven member is exposed to the action of the force transmitting elements 17 at two mutually opposed points thereof, thereby ensuring a positive and accurate two-way positioning of the driven member without requiring any spring means as in the first embodiments described.

In the further form of the invention shown in FIG. 9, the force transmitting elements are dumbbell rollers 17 similar to those used in FIGS. 5-6. The channel through which these elements are fed is a generally circumferential slot 2 defined between the pair of platens 11 and 12. The driven member is provided by the parallel spaced flanges 24 formed with angularly spaced peripheral teeth 25 defining between them rounded notches or recesses corresponding in radius to the radius of the enlarged heads of the rollers 17. Only flange 24 is visible in FIG. 9 it being understood that the other flange is similar thereto being disposed on the far side of the platen. Both flanges are secured on a common pivot 14 journalled in platen 11. The drive member comprises the pair of parallel spaced disks 15 and 15a, only the former one being shown, secured on common pivot 6 journalled in the platen. Each disk 15, 15a is formed with three angularly equispaced recesses 18 of a width corresponding to the diameter of the heads of the dumbbell elements and of a radial or depth dimension such that the bottom of each notch 18 describes a circumferential path substantially tangent to the inner circumferential wall of channel 2. The operation of the system in this form of the invention somewhate resembles that of a Geneva cross transmission device, though of course differing essentially therefrom in the use of the force transmitting elements 17.

On continuous rotation of the driver member 15–15a, the driven member 24 will be incrementally rotated, and will be positively locked against displacement in all intermediate positions between increments.

FIG. 10 illustrates a modification of the embodiment described earlier with reference to FIG. 7. Driven member 26 is linearly displaceable and has a pair of parallel spaced upwardly projecting arms of which only arm 13 is visible, slidable on opposite sides of the platen 12 adjacent to a rectilinear segment of the channel 2 formed in the platen. The force transmitting roller elements 17 act against opposite sides of the arms 13 and, depending on the direction in which the drive member 15, here formed with four equispaced recesses, is rotated about the common pivot 6, the driven member 26 will be incrementally driven in one or the other sense.

FIGS. 11 and 12 illustrate an improved door-lock assembly and embodying a transmission system of a type similar to that shown in FIGS. 7 and 8 described above. The lock assembly comprises a conventional sheet steel case 101 in which a dead-bolt member 102 is slidably positionable. The bolt 102 includes the parallel spaced shanks 103, 103a within the lockcase. The upper edges of the shanks each include an horizontal portion 104 defining the bottom wall of a channel for the cylindrical rollers 105 constituting the force-transmitting elements of the invention, said horizontal portion being terminated by an upwardly projecting abutment as shown. The drive member comprises the parallel spaced flanges 106, 107 formed with four equispaced recesses in registering positions as between both flanges. The flanges are secured on a common pivot 108 which projects outward through one wall of the lock case for rotation by means of a conventional latch-key inserted in the safety latch drum 109, attached to a side of case 101. Alternatively, the pivot 108 may be arranged for rotation from either side of the lock by means of respective safety latch drums as shown in connection with FIG. 14 later described. A pair of stationary, shaped members 110, 110a are secured in the case 101 as by solder or through a bracket such as bracket 117 in FIG. 13 later described, and their bottom edge surface is conformed so as to define the upper wall of a channel of generally similar shape to that of channel 2 in FIG. 7, in which the cylindrical rollers 105 are contained. The members 110, 110a may have their left- ends inserted in slots formed in the end plate 113 of the case 101. A portion 112 of the bottom wall of the lock case is struck out inwards to provide a guide for the bottom surface of bolt shanks 103, 103a. A front closure plate for the lock case is provided as shown at 114 in FIG. 12, defining one side wall of the conduit, while the opposite side wall is provided by the inner surface of the rear wall of the case 101. A midplate 111 secured to the lock case intermediate the front and rear walls provides a platen similar in function to platen 11 in FIG. 7 and 8 for defining the central portion of the conduit in which the intermediate shanks of dumbbell rollers 105 ride.

In the lock assembly so far described, it will be understood that rotation of a latchkey in the safety latch 109 in the form of a rotary cylinder lock will rotate the flanges 106 and 107 in one or the other direction thereby advancing or retracting the bolt 102 by incremental steps by a process similar to that described with reference to FIGS. 7 and 8, it being noted that the bolt will be positively blocked against displacement at all positions between successive incremental steps. The arrangement may be such that one revolution of flanges 106, 107 will move bolt 102 from fully retracted to fully projected position.

The lock assembly shown in FIGS. 11 and 12 further includes a bevel bolt 130 secured to one end of a draw-rod 118 shown as extending the length of the lock case and projecting from the other end thereof where a drawknob 131 is attached thereto. A compression spring 115 seated at one end between an abutment projecting from the side of the lock case and an abutment wall secured to rod 118 at its other end (near the bevel bolt 130) urges the bevel bolt to its extended or projecting position. The bevel bolt may further be actuated by means of an ordinary door handle not shown, serving to rotate a square pivot 116 on which is secured a conventional cam arm 117 engaging an abutment provided on the draw rod 118 whereby clockwise rotation of the knob and pivot 116 (according to FIG. 11) will actuate draw-rod 118 rightwards and retract bevel bolt 130 in opposition to spring 115. Means are further provided whereby in the fully retracted condition of dead bolt 102, rotation of the latchkey in latch 109 will impart an additional limited angular displacement to the flanges 106, 107 to retract the bevel bolt 130.

For this purpose there is provided a pawl-like member or arm 119 having a bent portion near its upper end extending through an opening in the draw-rod 118, and the upper end of said arm 119 being in pivotal engagement with a downbent end part of the previously-mentioned plate 132 secured to the draw-rod. The bevelled lower end of pawl arm 119 is in engagement with complementary notches 137 formed in the periphery of the camming members 106, 107 between adjacent ones of the roller-receiving recesses therein.

When the latchkey is rotated to rotate the flanges 106, 107 counterclockwise (FIG. 11) to extend the deadbolt 102 out of the lock-case, the pawl 119 slides along the cylindrical periphery of camming flanges 106, 107. As the dead bolt advances towards its locking position a spring strip 120 having one end secured to the rear ends of bolt shanks 103 and 103a and jutting forwards and upwards therefrom, engages under the extremity of pawl 119 between said pawl and the periphery of cams 106 and 107 to prevent the pawl end from dropping into a roller-receiving recess of said cams. Thus the pawl arm 119 does not interfere with the normal operation of the dead bolt, during extension thereof to and from bolting position. In the retracted position of said dead bolt, as shown in FIG. 11, cams 106 and 107 are capable of being rotated an additional small angular amount clockwise from the position shown. This additional rotation will impart a rightward displacement by way of pawl arm 119 (engaging notch 137) to the assembly comprising draw-rod 118, plate 132 and bevel bolt 130, retracting the bevel bolt against the force of spring 115. This arrangement permits of conveniently opening a door on which the lock assembly is mounted by a single continuous movement of a latchkey in latch 109, without having additionally to turn the door-knob.

The lock assembly shown in FIGS. 13 and 14 is of a simplified construction including only dead bolt 102 but no bevel bolt such as 130 in FIGS. 11 and 12, and hence lacks those parts of the mechanism just described with reference to FIGS. 11 and 12 which involved the bevel bolt. The remaining mechanism is generally quite similar to that last described and hence does not require further description, it being noted that like parts have been designated by the same reference numerals in both embodiments. In connection with this embodiment of FIGS. 13 and 14 it may be observed that the resulting lock assembly is of an especially simple and positive character in that it does not include any spring means, and has a relatively small number of strong simple parts.

The lock assembly shown in FIG. 15 includes a slidable dead bolt 201 positioned at the top of a generally vertical lock case. Formed in the bolt is a downwardly open recess 205 in which is engaged the rounded upper end 204 of one arm of a lever 202 pivoted on a pin 203 near the lower end of the lock-case. The lever 202 includes an arcuate surface 208 concentric with pivot 203 and terminating in a radially outwardly projecting abutment 210. The surface 208 defines one wall of an arcuate conduit the other (radially-outer) wall of which is defined by a complementarily-shaped surface 211 of a plate 209 secured in the lock-case, and the horizontal upper edge of which contributes to the guiding of the bolt 201 in its sliding displacements. Plate 209 is formed with a semi-circular recess communicating with the arcuate channel 208–211 and having its center positioned on the arcuate center line of said channel. Rotatably mounted in this recess about a pivot 209 coaxial therewith is a cam member 207 having four equispaced notches therein adapted to cooperate with a set of balls or rollers 206 positioned in the afore-mentioned channels to provide a motion-transmitting system in accordance with the invention. It will be noted that the force transmitting elements 206 act on one side against the end projection 210 of lever 202 and on the other side against the other end projection 204 of said lever. This lock construction is simple, positive-acting and reliable.

It will be understood that various other practical embodiments and applications of the invention will be conceivable in addition to the few specifically illustrated and described herein, without departing from the scope of the invention.

What I claim is:

1. Lock mechanism comprising a displaceable bolt; a manually rotatable bolt actuator, stationary means cooperating with said bolt for defining a channel-like path therewith and a number of roller-like elements movable on said path; spaced opposed surfaces on said bolt for defining the limits of said path; a drive member rotatable with said actuator and interposed in said path for dividing it into two path sections; and at least one pair of element-receiving recesses in said drive member for selectively transferring elements between said path sections for incrementally displacing said bolt between a fully projected and a fully retracted position.

2. Lock mechnism comprising a lock-case; a bolt displaceable in said case between a fully projected and a fully retracted position; a manually rotatable bolt actuator; a driven member in said case connected for displacement with said bolt; stationary means in said case cooperating with said driven member to define a channel-like path therewith and a plurality of roller-like elements movable over said path; spaced opposed surfaces of said driven member defining limits for said path; a drive member rotatable with said actuator and interposed in said path for dividing it into two sections; and at least one pair of element-receiving recesses in said drive member for selectively transferring elements between said path sections for incrementally displacing said driven member and incrementally displacing said bolt between said fully projected and fully retracted positions thereof.

3. Lock mechanism as claimed in claim 2, wherein said driven member is unitarily displaceable with said bolt.

4. Lock mechanism as claimed in claim 2, wherein said driven member is pivoted in said case for angular displacement therein and means pivotally connecting the driven member and bolt for producing linear displacement of the bolt on angular displacement of the driven member.

5. In the lock mechanism claimed in claim 2, a bevel-bolt displaceable in said lock case between a projected and a retracted position, spring means urging the bevel bolt to the projected position, a bevel bolt actuator manually displaceable to move the bevel bolt to retracted position; and means connected with said bevel bolt and engageable with said rotatable drive member in the fully retracted position of said first-mentioned bolt whereby an additional rotation of said drive member in the same direction as the direction for retracting said first bolt will actuate said means to retract said bevel-bolt independently of said bevel bolt actuator.

References Cited in the file of this patent

UNITED STATES PATENTS

| 2,002,709 | Niederhauser | May 28, 1935 |
| 2,551,821 | Bengtson | May 8, 1951 |
| 2,869,377 | Pieterse | Jan. 20, 1959 |
| 2,869,378 | Fischer | Jan. 20, 1959 |

FOREIGN PATENTS

| 144,289 | Australia | Nov. 20, 1951 |